United States Patent
Lundquist et al.

(10) Patent No.: US 9,539,690 B2
(45) Date of Patent: Jan. 10, 2017

(54) CONTROL FEEDBACK LOOP FOR REAL-TIME VARIABLE NEEDLE PEEN FORMING

(71) Applicant: The Boeing Company, Chicago, IL (US)

(72) Inventors: Lauren K. Lundquist, Maple Valley, WA (US); McKay A. Kunz, South Prairie, WA (US); James E. Pillers, Seattle, WA (US); James B. Castle, Saint Charles, MO (US); John Z. Lin, Renton, WA (US); Sebastian Nervi, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 511 days.

(21) Appl. No.: 14/031,771

(22) Filed: Sep. 19, 2013

(65) Prior Publication Data
US 2015/0075240 A1     Mar. 19, 2015

(51) Int. Cl.
B21D 31/06     (2006.01)
B23Q 15/02     (2006.01)
(Continued)

(52) U.S. Cl.
CPC ........... *B23Q 15/02* (2013.01); *B21D 31/06* (2013.01); *B23Q 17/20* (2013.01); *B24B 39/006* (2013.01);
(Continued)

(58) Field of Classification Search
CPC ......... B21D 31/06; C21D 7/06; B24B 39/006; B24B 39/02; B24B 39/04; B24B 39/06; B24C 1/10; B23P 9/04; B23Q 15/06
See application file for complete search history.

(56) References Cited

U.S. PATENT DOCUMENTS

| 4,349,074 A | 9/1982 | Ince |
| 4,416,130 A | 11/1983 | Judge, Jr. |

(Continued)

FOREIGN PATENT DOCUMENTS

| EP | 1528110 A1 | 5/2005 |
| WO | 2004028739 | 4/2004 |

OTHER PUBLICATIONS

Bleicher et al, Mechanism of surface modification using machine hammer peening technology, CIRP Annals—Manufacturing Technology, 2012, pp. 375-378, vol. 61.

(Continued)

*Primary Examiner* — Debra Sullivan
(74) *Attorney, Agent, or Firm* — Kunzler Law Group, PC

(57) ABSTRACT

Method and apparatus are provided for processing and changing the physical characteristics of a metal workpiece into a final metal component. Predetermined processing parameters are established for achieving a final metal component. The metal workpiece is positioned securely on a support during the changing of the physical characteristics. Impacts are applied to a surface of the workpiece multiple times for achieving the final metal component while controlling the impacting with the predetermined processing parameters. A sensor is provided for continuously sensing the currently existing physical conditions of the workpiece during impacting. The predetermined processing parameters are changed into adjusted processing parameters and the impacts are changed in reaction to the currently existing physical conditions of the workpiece from the sensing and processing of the workpiece until the final metal component has been achieved.

19 Claims, 3 Drawing Sheets

(51) Int. Cl.
*B23Q 17/20* (2006.01)
*B24C 1/10* (2006.01)
*C21D 7/04* (2006.01)
*C21D 7/06* (2006.01)
*C22F 1/00* (2006.01)
*B24B 39/00* (2006.01)

(52) U.S. Cl.
CPC . *B24C 1/10* (2013.01); *C21D 7/04* (2013.01); *C21D 7/06* (2013.01); *C22F 1/00* (2013.01)

(56) References Cited

U.S. PATENT DOCUMENTS

| | | | |
|---|---|---|---|
| 4,694,672 A | 9/1987 | Baughman | |
| 5,742,028 A | 4/1998 | Mannava et al. | |
| 5,771,729 A | 6/1998 | Bailey et al. | |
| 6,410,884 B1 | 6/2002 | Hackel et al. | |
| 6,664,506 B2 | 12/2003 | Clauer et al. | |
| 6,670,578 B2 | 12/2003 | Hackel et al. | |
| 6,698,268 B2 | 3/2004 | Woods et al. | |
| 6,742,377 B2 | 6/2004 | Woods et al. | |
| 6,932,876 B1 | 8/2005 | Statnikov | |
| 8,302,450 B2 | 11/2012 | Slattery et al. | |
| 8,323,427 B1 | 12/2012 | Slattery et al. | |
| 8,997,545 B1 | 4/2015 | Lundquist et al. | |
| 2007/0234772 A1 | 10/2007 | Prevey | |
| 2008/0308199 A1 | 12/2008 | Locker | |
| 2010/0257910 A1* | 10/2010 | Castle | B21D 22/02 72/57 |
| 2014/0007394 A1 | 1/2014 | Haas | |

OTHER PUBLICATIONS

Extended European Search Report for Patent Application No. 14176571.9 dated Feb. 20, 2015.

DeBoer, Clint "How's It Work? Rotary Hammers", published on ProTool Reviews vol. 1 Issue 3 May 2013.

DeWalt Product Service website Model D25831 http://servicenet.dewalt.com/Products/Detail?productNumber=D25831K.

Didier, Will, "Development and Validation of a Mathematical Model for Predicting the Performance of Rotary Hammer Drills" (2013). University of Wisconsin Milwaukee UWM Digital Commons Theses and Dissertations. Paper 88.

Office Action for Canadian Patent Application No. 2,858,399 dated Dec. 2, 2015.

Office Action for Canadian Patent Application No. 2,858,489 dated Oct. 7, 2016.

Office Action for European Patent Application No. 14176571.9 dated Oct. 6, 2016.

* cited by examiner

CONTROL FEEDBACK LOOP FOR REAL-TIME VARIABLE NEEDLE PEEN FORMING

CROSS-REFERENCE TO RELATED APPLICATIONS/INCORPORATION BY REFERENCE

This application is a related application to a United States patent application, entitled "Method and Apparatus for Impacting Metal Parts for Aerospace Applications," filed on even date herewith, namely, Sep. 19, 2013, under U.S. patent application Ser. No. 14/031,690, which application is also incorporated by reference into this application entitled "CONTROL FEEDBACK LOOP FOR REAL-TIME VARIABLE NEEDLE PEEN FORMING".

FIELD

The disclosure relates to the use of mechanical systems to change physical characteristics of metal parts. More specifically, the disclosure relates to a method and apparatus of mechanical processing, such as peening metal workpieces for making metal components for the aircraft and aerospace industry.

BACKGROUND

Metal workpieces, including sheet or plate metal, are known to be processed into useful components by using prior systems such as shock peening, ultrasonic peening, and laser peening. Although such systems work quite well, at times problems occur when additional processing of the workpiece or part by further peening is required in order to achieve a component part that meets the design requirements of the component part. Such additional processing adds to the production costs of the processed component parts.

In the above identified related application, which has been incorporated herein by reference, the use of adjustable parameters is disclosed for controlling the impacting of metal workpieces into final metal components. Such controlling provides for a significantly more efficient processing of the metal components than result from the prior systems.

A need currently exists for providing a system to process metal workpieces into final metal components wherein the processing is made more efficient over the prior systems and, further, combines with the system described in the related application to provide a highly efficient multiple impacting system which involves little, if any, additional processing time to achieve a final metal component.

Further limitations and disadvantages of conventional and traditional approaches will become apparent to one of skill in the art, through comparison of such systems with the present disclosure as set forth in the remainder of the present application with reference to the drawings.

BRIEF SUMMARY

In one aspect of the disclosure, a method is provided for processing and changing physical characteristics of a metal workpiece into a final metal component. Predetermined processing parameters are established through previous testing for achieving a final metal component. The workpiece is securely positioned during the changing of physical characteristics. A surface of the workpiece is impacted multiple times by a driven member for achieving the final metal component while controlling the impacting by the predetermined processing parameters. The method includes sensing currently existing physical conditions of the workpiece during the impacting. As the physical conditions of the workpiece change, the predetermined processing parameters are adjusted into adjusted processing parameters from the sensing of the currently existing conditions of the workpiece. Further impacts are applied to the surface of the workpiece while controlling the impacts with the adjusted processing parameters.

A further aspect of the disclosure involves a method for processing and forming a contour for a metal workpiece. Predetermined processing parameters are established for achieving the contour for the workpiece. A controller is provided and the predetermined processing parameters are installed in the controller. An end effector is provided and a driven member is mounted on the end effector. The end effector and the controller communicate with each other. The workpiece is positioned for processing until the workpiece has achieved the contour. A driven member is provided for impacting a surface of the workpiece multiple times for achieving a contour for the workpiece under the control of the predetermined processing parameters. A sensor monitors existing physical conditions of the workpiece during impacting. A manipulator communicates with the controller for locating and moving the end effector through a predetermined motion path under the control of the predetermined processing parameters. The predetermined processing parameters are adjusted into adjusted processing parameters in reaction to the existing physical conditions of the workpiece received from the sensor. Further impacting of the workpiece is under the control of the adjusted processing parameters.

Still a further aspect of the disclosure involves the provision of an apparatus for changing the physical characteristics of a metal workpiece into a metal component. A support is provided for positioning the workpiece during processing. A driven member applies multiple impacts to a surface of the workpiece. A controller having predetermined processing parameters is connected to the driven member for applying multiple impacts against a surface of the workpiece under the control of the predetermined processing parameters for changing the physical characteristics of the metal workpiece. A sensor is provided for sensing the existing physical conditions of the workpiece while the driven member is applying multiple impacts to the workpiece. A feedback system transmits the sensed physical conditions of the workpiece to the controller for adjusting the predetermined processing parameters into adjusted processing parameters in reaction to the existing physical conditions of the workpiece for further impacting for achieving the metal component.

The features, functions, and advantages that have been discussed can be achieved independently in various embodiments or may be combined in yet other embodiments, further details of which can be seen with reference to the following description and drawings.

DETAILED DESCRIPTION

Figure 5:
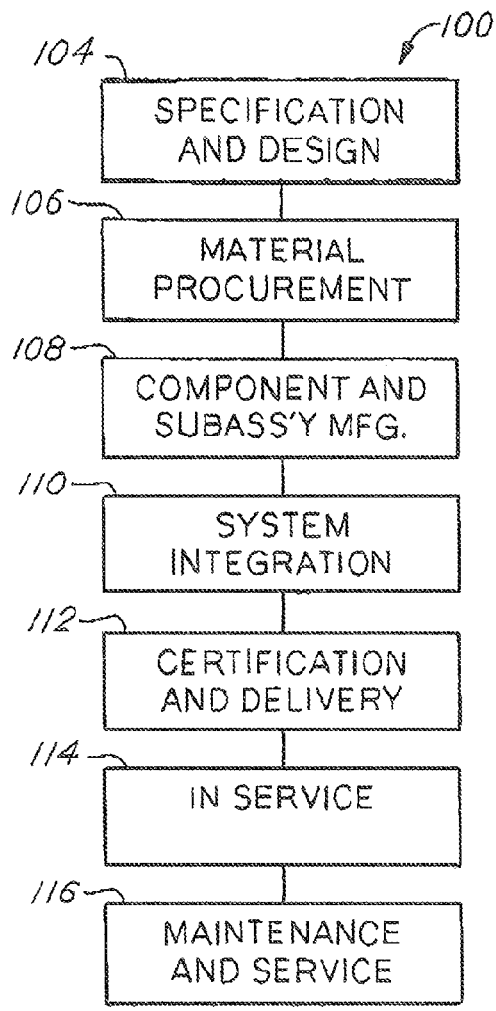
FIG. 5 is a flow diagram of aircraft production and service methodology.
Figure 6:
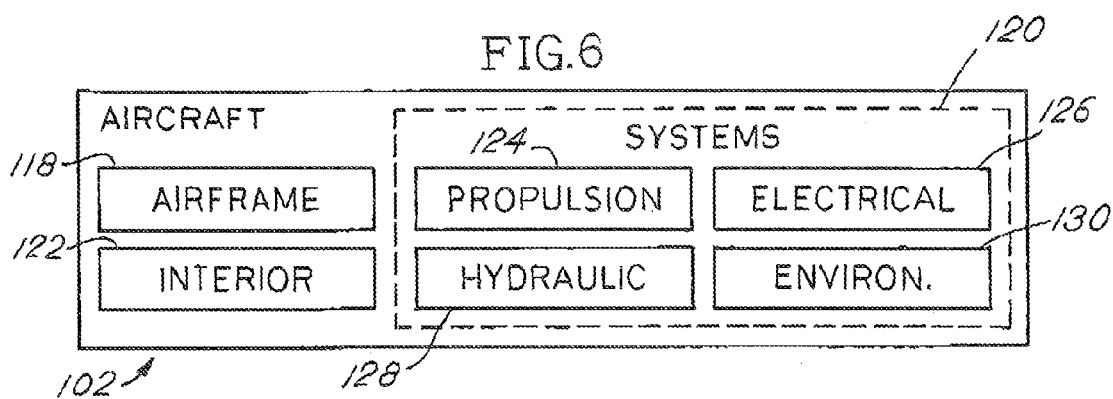
FIG. 6 is a block diagram of an aircraft.

Referring to the drawings, examples of the disclosure may be described in The context of an aircraft manufacturing and service method 100 as shown in FIG. 5 and an aircraft 102 as shown in FIG. 6. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus example, method example, or a combination thereof may be utilized during the production stages 108 and 110, for example, by substantially expediting assembly of or reducing the cost of an aircraft 102. Similarly, one or more of apparatus example, method example, or a combination thereof may be utilized while the aircraft 102 is in service, for example and without limitation, to maintenance and service 116.

Referring to FIGS. 5 and 6, the description of the present disclosure to be hereinafter provided generally falls within category 108 "Component and Subass'y Mfg." and also generally falls within category 118 "Airframe."

The present disclosure is directed to an apparatus and method for changing the physical characteristics of metal workpieces or parts. by multiple impacts. The workpiece may be sheet metal or plate or an extrusion or an assembly and may have a thickness range of 0.062 to 2.00 inches. Each workpiece W may have different dimensions in length, width, and thickness. Each workpiece W may have multiple surfaces which receive multiple impacts. The metal itself may be a metal such as aluminum, titanium or metal alloys. In essence, the metal or metal alloy workpiece may exist in a variety of geometries and configurations.

Figure 2:
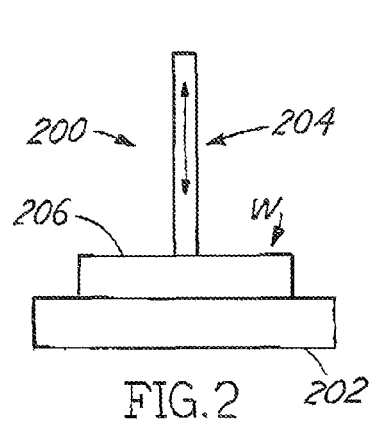
FIG. 2 is schematic, simplified view of a driven member impacting a metal workpiece.

In the related co-pending patent application, identified above, the apparatus and method described therein involve changing the physical characteristics of a metal workpiece, including the contour of the workpiece W. Referring to FIG. 2 herein, the simplified schematic view illustrates a workpiece W which is positioned on a support 202. Although the support 202 is shown in FIG. 2 as being in a horizontal position, it is to be understood that the support 202 for the workpiece W may be mounted in a vertical position, as well as potentially at any angle between the vertical and horizontal.

The support 202, like the workpiece W, has certain designed dimensions and is able to receive and process each workpiece W. In some cases, a workpiece W may be impacted in its entirety on a given support 202 by the driven member 204. In other cases, a lengthy workpiece W may be processed in consecutive sections of the same workpiece. The leading section of a lengthy workpiece W may be processed while being secured on the support. The leading section is moved forward while adjacent trailing sections of similar dimensions are impacted later in the overall process in a stepwise manner.

In all of the workpieces W being processed, each workpiece W is supported during impacting by the driven member 204 over the entire surface 206 which is the equivalent of the impact coverage area. As to be described hereinafter in detail, the driven member 204 is controlled by a manipulator and an end effector for impacting the entire coverage area of an entire workpiece W or of each section of a lengthy workpiece W while being positioned on a support 202.

A driven member 204 is provided for applying multiple impacts to the surface 206 of the workpiece W, as schematically shown in FIG. 2. The impact energy moves as a shock wave through the driven member 204 to the surface 206 of the workpiece W. The shock wave is transferred from the workpiece surface 206 as an internal compressive layer within the workpiece W. The compressive layer acts to change the workpiece into a final metal component having changed physical characteristics, such as a desired contour. The driven member 204 desirably has a hardness greater than the workpiece W.

Referring to the above-identified related application, one type of a mechanical device (not shown herein) is provided for causing the driven member to apply multiple impacts to the surface 206 of a workpiece W while the workpiece W is in place on a support 202. Specifically, the device (number 210 in FIG. 1 of the related application) is described in detail and is one type of device which may be used operate the impacting of the driven member in this disclosure.

Figure 3:
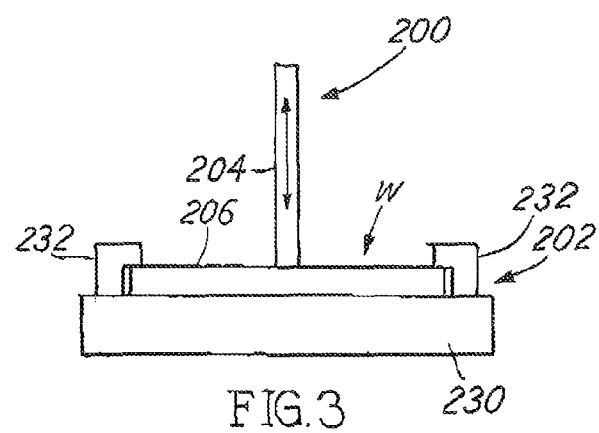
FIG. 3 is a schematic view, similar to FIG. 2, except one example of a workpiece is shown being secured in place by clamps on a support while impacts are being applied to the metal workpiece by a driven member.

Multiple examples of supports 202 for the workpiece W are described in the above-identified related application. One such support is shown in FIG. 3 hereof. Each example support 202 described in the related application secures the workpiece W during processing. Each example support 202 acts as an anvil on the opposite side of the workpiece W while the driven member 204 is applying multiple impacts to the surface 206 of the workpiece W. Further, clamps, not shown in FIG. 2, to be described, cooperate with the supports 202 to secure the workpiece W in place during impacting by the driven member 204. Each clamp is elongated and may extend for the entire length of the support 202 during impacting by the driven member 204.

Referring to FIG. 3, the workpiece W is mounted on a flat plate 230 which is the support 202 for the workpiece W. The impact energy from the driven member 204 moves as a stress wave to the surface 206 of the workpiece. Clamps 232, which may be elongated, secure the workpiece W against the flat plate 230 to thereby avoid compressive forces, resulting from the impacting, to undesirably raise portions of the workpiece W and cause a loss of energy during impacting. Such raising of portions of the workpiece has occurred in the prior metal processing systems discussed above. Various additional supports and clamps are described in the above identified related application. It is to be understood that the types of supports and clamps that may be used for the method and apparatus described herein may vary over a wide range.

Predetermined processing parameters are provided for changing the physical characteristics of the workpiece W into a desired final component. The predetermined processing parameters for changing the physical characteristics of the workpiece W include a predetermined energy level for the impacts on the workpiece W, a rate of application of the impacts on the workpiece W and the coverage area of the impacts on the workpiece W.

In the present disclosure, a method and apparatus are provided for real time changing of the predetermined processing parameters for controlling the impacts of the driven member 204 during processing of the workpiece W. A sensor is provided for monitoring or sensing existing physical conditions of the workpiece during impacting under control of the predetermined processing parameters. One type of information that the sensor may provide is the depth or thickness of the workpiece W at the next section to be impacted by the driven member 204. The depth information causes a real time change in the predetermined processing parameters into adjusted processing parameters which then control the impacting of the next section of the workpiece W to be impacted. Such real time changing reduces production costs by reducing or avoiding the amount of additional processing of a workpiece W. Ideally, avoiding additional impacting of the workpiece W into a final metal component is highly desirable.

Figure 1:
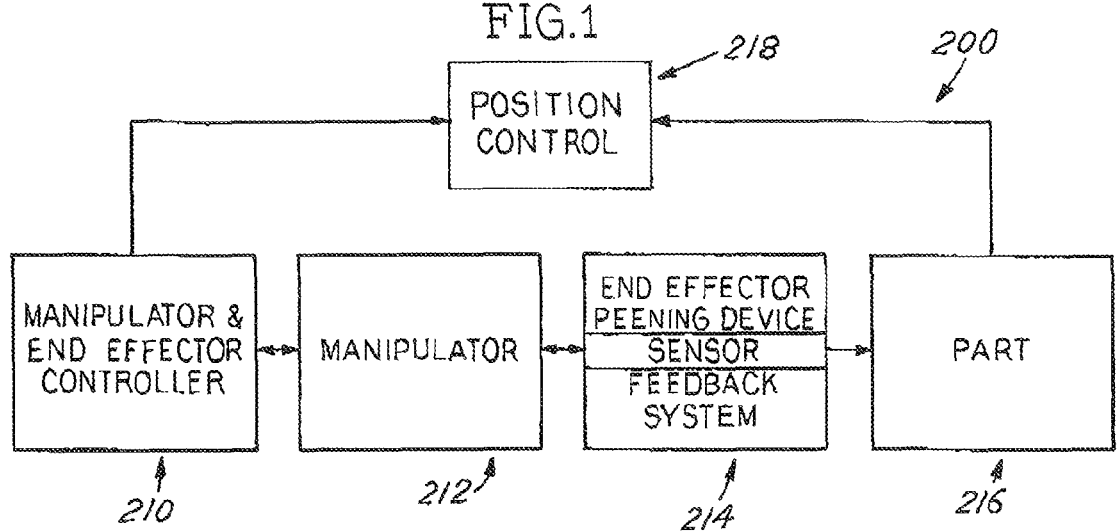
FIG. 1 is a flow diagram representing an apparatus, method and system for processing the physical characteristics of a metal workpiece into a final metal component.

Referring to FIG. 1, a flow diagram is shown. The method and apparatus for applying impacts by the driven member 204 are to be described by reference to the flow diagram. A controller is provided for operating a manipulator and an end effector. The controller is represented in flow diagram box 210 entitled "Manipulator & End Effector Controller". A manipulator is represented in flow diagram box 212 entitled "Manipulator". The driven member 204 is mounted on the end effector for applying multiple impacts against the workpiece W. The driven member 204 is included within the meaning of the term—peening device—in the flow diagram box 214 entitled "End Effector Peening Device/Sensor/Feedback System." In this one example, a sensor is mounted on the end effector peening device. It is to be understood, however, that one or more sensors may be located in locations other than or in addition to having a sensor located other than on the end effector. Locating at least one sensor on the end effector is advantageous since the sensor is mounted in close proximity to the impacting area by the driven member. A workpiece W is identified in the flow diagram Box 216 as "Part". A control for the location of a workpiece W on a support 202 is identified in the flow diagram (Box 218) as "Position Control". Each operating part disclosed in the flow diagram will be briefly described together with each of their respective functions.

When the workpiece W is securely mounted on a support 202, the position information for the workpiece W is communicated to the manipulator and end effector controller (Box 210). The manipulator and end effector controller receive the path information for the end effector from a System Control (not shown in the flow diagram of FIG. 1). The manipulator and end effector controller drives the motion control system for the manipulator and end effector peening device through a programmed path of travel. The manipulator communicates with the end effector at the current location of the end effector relative to the surface of the workpiece W. The manipulator locates and controls the end effector to move in a pre-planned motion path under the control of the predetermined processing parameters. The end effector peening device (Box 214) causes the driven member 204 to apply multiple impacts under control of the predetermined processing parameters to the workpiece W as commanded by the controller (Box 210). The workpiece W is secured in position on a support 202. The Position Control (Box 218) provides the manipulator and the end effector controller with the workpiece W position on the support 204.

At the startup of the method of operation on the workpiece W, the manipulator and the end effector controller is provided with predetermined processing parameters for changing the physical characteristics of the workpiece W into a desired final component. The predetermined processing parameters for changing the physical characteristics of the workpiece W include the energy level for the impacts on the workpiece W, a rate of application of the impacts on the workpiece W and the coverage area of the impacts on the workpiece W. The energy level of the impacts is in a range of 1-35 Joules. The impacts are applied by the driven member 204, a component of the end effector peening device (Box 214). The impacts by the driven member 204 are under the control of the manipulator and end effector controller (Box 210). The controller communicates the predetermined processing parameters, which are installed in the controller, to the manipulator and end effector. The movement of the end effector and the manipulator and the impacting of the driven member are under the control of the predetermined processing parameters.

In the present disclosure, at least one sensor may be mounted on the end effector peening device (Box 214). The sensor senses real time information about the workpiece W, such as the depth or thickness of the upcoming section of the workpiece W. Such real time information is received by the manipulator and end effector controller (Box 210) for quality control of the workpiece W being processed by the apparatus 200. As described previously, other sensors may be used but the sensor mounted on the end effector is advantageously used but is not required.

A feedback system (Box 214) is provided for receiving the real time information from the sensor for adjusting the predetermined processing parameters into adjusted processing parameters. By collecting and storing the real time information, the predetermined processing parameters are changed into adjusted processing parameters in order to improve the efficiency of the processing by avoiding additional impacting of the processed workpiece W so that the final metal component meets quality control standards and design standards. The adjusted processing parameters, like the predetermined processing parameters, include a predetermined energy level for the impacts on the workpiece W, a rate of application of the impacts on the workpiece W and the coverage area of the impacts on the workpiece W. The sensor communicates real time progress on the workpiece W and reduces or desirably avoids additional processing of the workpiece W until a final metal component has been achieved. The goal is to complete the processing of the workpiece W in a one step or a continuous process of the workpiece without the need for intermediate or off-line evaluation of progress. This results in significant improvements in overall processing efficiency including production costs.

Figure 4:
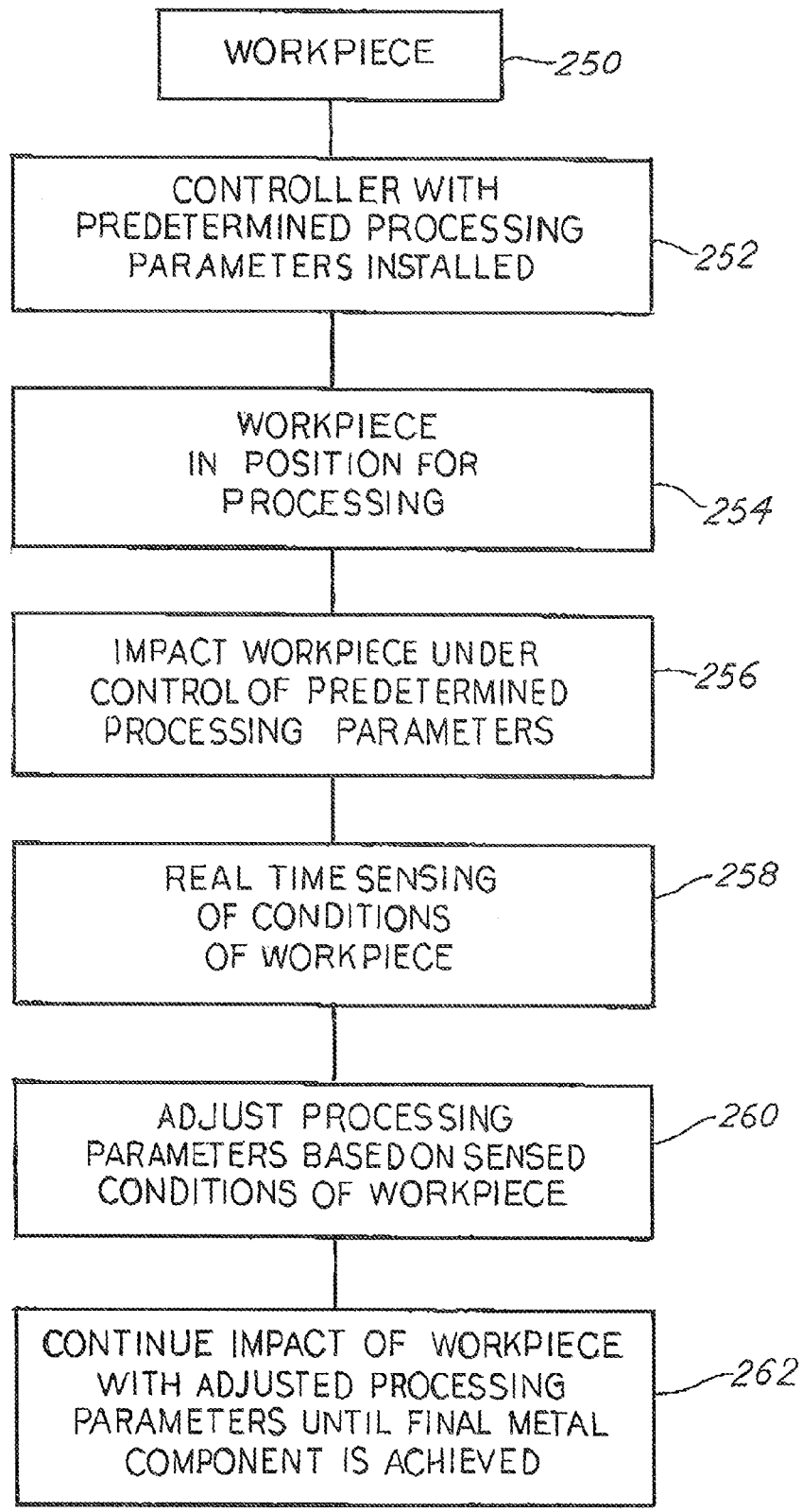
FIG. 4 is a flow diagram illustrating a method for processing the physical characteristics of a metal workpiece into a final metal component.

As a further description, the method for processing a metal workpiece W into a final. metal component, reference is made to the flow diagram of FIG. 4. A workpiece 250 is provided with at least one surface and is to be processed for changing the physical characteristics of the workpiece into a final metal component. A controller 252 is provided wherein predetermined processing parameters used for achieving the final metal component have been installed in the controller. The workpiece is in position 254 for processing. Once the workpiece is in position, impacts on the workpiece W, which are under control of the predetermined processing parameters 256, proceeds for achieving the final component. The impacting over the entire surface of the existing condition of the workpiece is sensed in real time 258. The predetermined processing parameters are adjusted into adjusted processing parameters so the impacts are changed in reaction to the existing conditions of the workpiece 260 provided by the sensing of the physical conditions of the workpiece. The impacts continue against the workpiece under the control of the adjusted processing parameters until a final component has been achieved 262. It is to be understood that during the continuous processing of the workpiece W, adjusted processing parameters may be further adjusted accordingly based on further changes in the existing conditions of the workpiece 260 provided by the sensing of the physical conditions of the workpiece.

While the disclosure has been described with reference to certain examples, it will be understood by those skilled in the art that various changes may be made and equivalents may be substituted without departing from the spirit and scope of the present disclosure. In addition, many modifications may be made to adapt a particular situation or material to the teachings of the present disclosure without workpiece departing from its scope. Therefore, it is intended that the present disclosure not be limited to the particular examples disclosed, but that the present disclosure will include all examples falling within the scope of the appended claims.

What is claimed is:

1. A method for processing a metal workpiece for changing physical characteristics of the metal workpiece wherein the workpiece has a surface, the method comprising the steps of:
    establishing predetermined processing parameters for achieving a final metal component;
    positioning the workpiece during the changing of physical characteristics;
    applying impacts to the surface of a first section of the workpiece while controlling the impacts with the predetermined processing parameters;
    sensing currently existing physical conditions of a second upcoming section of the workpiece during the applying impacts step;
    adjusting the predetermined processing parameters for the impacts into adjusted processing parameters in reaction to the currently existing physical conditions of the second upcoming section of the workpiece from the sensing of the currently existing physical conditions of the workpiece; and
    applying further impacts to the surface of the second upcoming section of the workpiece while controlling the impacts with the adjusted processing parameters.

2. The method of claim 1 wherein the applying further impacts step continues until a final metal component has been achieved.

3. The method of claim 1 including sensing currently existing physical conditions of the workpiece while applying further impacts to the surface of the workpiece.

4. The method of claim 1 wherein the predetermined processing parameters and the adjusted processing parameters both include an impact coverage area on the workpiece, energy levels of the impacts, and a rate of application of the impacts on the coverage area of the workpiece.

5. The method of claim 1 including providing a driven member, and applying the impacts with the driven member.

6. The method of claim 5 including providing an end effector and mounting the driven member on the end effector.

7. The method of claim 6 including mounting a sensor on the end effector and performing the sensing step with the sensor.

8. The method of claim 6 including providing a manipulator for controlling the end effector for applying the impacts on the surface of the workpiece with the driven member.

9. The method of claim 8 including providing a controller communicating with the manipulator for locating and moving the end effector through a motion path.

10. The method of claim 1 wherein a physical characteristic of the workpiece comprises a contour for the workpiece.

11. A method for processing and forming a contour for a metal workpiece, wherein the workpiece has a surface, the method comprising the steps of:
    establishing predetermined processing parameters for achieving the contour for the workpiece;
    providing a controller;
    installing the predetermined processing parameters in the controller;
    positioning the workpiece for processing until the workpiece has achieved the contour;
    providing an end effector and a driven member mounted on the end effector;
    communicating with the controller to the end effector with the predetermined processing parameters;
    impacting the surface of a first section of the workpiece multiple times with the driven member under the control of the predetermined processing parameters for achieving the contour of the workpiece;
    providing a sensor for monitoring existing physical conditions of a second upcoming section of the workpiece during impacting;
    providing a manipulator for communicating with the controller for locating and moving the end effector and driven member through a predetermined motion path under the control of the predetermined processing parameters; and
    adjusting the predetermined processing parameters into adjusted processing parameters in reaction to existing physical conditions of the second upcoming section of the workpiece received from the sensor for further processing of the second upcoming section of the workpiece with the adjusted processing parameters for achieving a contour for the second upcoming section of the workpiece.

12. The method of claim 11 wherein the predetermined processing parameters and the adjusted processing parameters both include energy levels of the impacting on the workpiece, a rate of application of the impacting on the workpiece, and a coverage area of the impacting on the workpiece.

13. Apparatus for processing a metal workpiece to a metal component, wherein the workpiece has a surface, the apparatus comprising:
a support for the workpiece during the processing;
a driven member for applying multiple impacts to the surface of the workpiece;
a controller having predetermined processing parameters connected to the driven member for applying multiple impacts against the surface of a first section of the workpiece under the control of the predetermined processing parameters for changing physical characteristics of the metal workpiece;
a sensor for continuously sensing existing physical conditions of a second upcoming section of the workpiece while the driven member is applying multiple impacts to the first section of the workpiece; and
a feedback system for transmitting existing physical conditions of the second upcoming section of the workpiece from the sensor to the controller for adjusting the predetermined processing parameters into adjusted processing parameters in reaction to the existing physical conditions of the second upcoming section of the workpiece for further processing for achieving the metal component.

14. The apparatus of claim 13 wherein the metal workpiece is sheet metal and the metal component is a component useful on an aircraft.

15. The apparatus of claim 13 wherein the metal workpiece is plate metal and the metal component is a component useful on an aircraft.

16. The apparatus of claim 13 wherein the predetermined processing parameters and the adjusted processing parameters both include an impact coverage area on the workpiece, impact energy levels of the driven member, an impact coverage area on the workpiece and the rate of application of the impacts on the coverage area on the workpiece.

17. The apparatus of claim 13 including an end effector and the driven member is mounted on the end effector for applying the multiple impacts against the surface of the workpiece.

18. The apparatus of claim 17 including a manipulator for controlling the movement and location of the end effector for applying the impacts to the surface of the workpiece by the driven member.

19. The apparatus of claim 17 wherein the sensor is mounted on the end effector.

* * * * *